United States Patent
Beucher et al.

(10) Patent No.: US 9,255,648 B2
(45) Date of Patent: Feb. 9, 2016

(54) SELF-REGULATED COMPACT-GEOMETRY VALVE ASSEMBLY

(71) Applicant: SIEMENS AKTIENGESELLSCHAFT, Munich (DE)

(72) Inventors: Stephane Beucher, Louveciennes (FR); Jeremy Degraeve, Meudon la Foret (FR); Erhard Magori, Feldkirchen (DE); William Weugue, Gaillon sur Montcient (FR)

(73) Assignee: Siemens Schweiz AG, Zurich (CH)

( * ) Notice: Subject to any disclaimer, the term of this patent is extended or adjusted under 35 U.S.C. 154(b) by 8 days.

(21) Appl. No.: 14/053,833

(22) Filed: Oct. 15, 2013

(65) Prior Publication Data

US 2014/0103244 A1    Apr. 17, 2014

(30) Foreign Application Priority Data

Oct. 12, 2012   (EP) ..................................... 12290340

(51) Int. Cl.
*F16K 31/36* (2006.01)
*F16K 31/122* (2006.01)
*G05D 16/10* (2006.01)
*F16K 31/40* (2006.01)
*A62C 35/64* (2006.01)

(52) U.S. Cl.
CPC .......... *F16K 31/1221* (2013.01); *G05D 16/103* (2013.01); *A62C 35/645* (2013.01); *F16K 31/402* (2013.01); *Y10T 137/7781* (2015.04); *Y10T 137/7835* (2015.04)

(58) Field of Classification Search
CPC ............ F16K 31/402; Y10T 137/7781; Y10T 137/7835; A62C 35/645
USPC ................... 137/488, 494, 495, 498, 509, 79; 169/19, 20; 251/28, 30.02, 30.05
See application file for complete search history.

(56) References Cited

U.S. PATENT DOCUMENTS

| | | | | |
|---|---|---|---|---|
| 2,671,516 | A * | 3/1954 | Grant, Jr. .......................... | 251/25 |
| 2,819,763 | A * | 1/1958 | Boal ................................ | 169/77 |
| 2,829,720 | A * | 4/1958 | Heigis et al. ..................... | 169/11 |
| 3,776,313 | A * | 12/1973 | DePalma ......................... | 169/19 |
| 4,516,600 | A | 5/1985 | Sturman et al. | |
| 5,653,291 | A | 8/1997 | Sundholm | |
| 8,079,567 | B2 | 12/2011 | Beucher et al. | |
| 2013/0240221 | A1* | 9/2013 | Chaney et al. .................. | 169/46 |

FOREIGN PATENT DOCUMENTS

| KR | 20110027883 | A | 3/2011 |
|---|---|---|---|
| WO | 9417857 | A1 | 8/1994 |
| WO | 2006108931 | A1 | 10/2006 |

\* cited by examiner

*Primary Examiner* — R. K. Arundale
(74) *Attorney, Agent, or Firm* — Laurence Greenberg; Werner Stemer; Ralph Locher

(57) ABSTRACT

A self-regulated valve assembly contains a valve body which, in the lower part, has an input section for a connection to a tank intended to contain a fluid under pressure and, in the upper part, an output for connection to a pipe system. A piston is movable in the valve body along a first axis between an open position, enabling the fluid to communicate between the input section and the output, and a closed position. A spring type module is coupled to the piston and to the valve body and interacts dynamically with the piston at least after an actuation of the valve and during the entire cycle of self-regulation of the valve, imposing a positioning of the piston between its open and closed position. The spring type module is positioned beneath the lower sealing section of the piston and the dimensions of the valve assembly can be considerably reduced.

14 Claims, 1 Drawing Sheet

SELF-REGULATED COMPACT-GEOMETRY VALVE ASSEMBLY

CROSS-REFERENCE TO RELATED APPLICATION

This application claims the priority, under 35 U.S.C. §119, of European application EP 12290340.4, filed Oct. 12, 2012; the prior application is herewith incorporated by reference in its entirety.

BACKGROUND OF THE INVENTION

Field of the Invention

The present invention relates to a self-regulated valve assembly.

It is known that a self-regulated valve assembly has been presented and disclosed by international patent publication WO2006/108931A1, corresponding to U.S. Pat. No. 8,079,567. In principle and schematically according to FIG. 1, the self-regulated valve assembly 1 includes:

a) a valve body 2 which, in a lower part, has an input section 6 for a connection to a tank 3 intended to contain a fluid F under pressure and, in the upper part, an output 4 for connection to a pipe system, b) a piston 26 movable in the valve body 2 along a first axis 7 between an open position, enabling the fluid to communicate between the input section 6 and the output 4, and a closed position cutting off the fluid communication, the piston 26 having an upper end section 34, and a lower sealing section 42, c) a spring type module 28 coupled to the piston 26 and to the valve body 2 and interacting dynamically with the piston at least after an actuation Act of the valve and during the entire cycle of self-regulation of the valve, imposing a positioning of the piston between its open and closed position, allowing fluid communication between the input section 6 and the output 4 under a controlled output pressure.

Such a self-regulated valve assembly is thus currently delivered with a tank cap, which has to contain all these elements, making it possible to protect the valve body and coupled components, particularly in the event of dropping and finally in order to be in line with safety standards of the ISO type. At the present time, such a cap is made to measure and its dimensions, at least its internal height, exceeds about 155 mm. Thus, it is not always possible to provide for a cap of a standard type such as for example for usual compressed gas type tanks. The cost of the cap is therefore quite high at present, since it also requires more materials to produce it.

Furthermore, the self-regulated valve assembly presented in international patent disclosure WO2006/108931A1 contains an activation phase after actuation of about 2 seconds, which is very short, but ideally it would be better to minimize this period.

Finally, again according to the example presented in international patent disclosure WO2006/108931A1, in the self-regulation phase, the valve assembly advantageously makes it possible to obtain a controlled output pressure of 50 bar for at least about 35 seconds, then over about another 25 seconds, this controlled pressure falls slowly to about 20 bar. Ideally, it is desirable to maximize the period of maintenance of a constant controlled output pressure over at least the complete period of 60 seconds. It is also permissible perceptibly to reduce this constant pressure below 50 bar.

SUMMARY OF THE INVENTION

An object of the present invention is thus to present a self-regulated valve assembly exhibiting a more compact geometry so that the valve assembly positioned on a tank as disclosed above can be covered by a standard cap, in particular of an internal height equal to or less than 155 mm.

Finally, the self-regulated valve assembly according to the invention should ideally exhibit controlled output pressure features over a given period of time close to the ideal criteria as disclosed in the introductory part of the document.

For this purpose, a self-regulated valve assembly including a self-regulated valve which can be plugged into a tank containing a fluid (liquid/gas) under high pressure, for example an extinguishing agent under 300 bar, is thus proposed. This assembly is smaller in size than that in FIG. 1 and exhibits, in preferential embodiments, optimized features of controlled output pressure over a period of time.

An exemplary embodiment of the self-regulated valve assembly according to the invention is shown in FIG. 2.

Analogously to FIG. 1 and in accordance with the operating mode of the valve assembly (or valve) disclosed in international patent disclosure WO2006/108931A1, the valve assembly according to the invention (FIG. 2) in principle follows the same operating rules. For reasons of clarity with respect to the different operating phases of the valve assembly (actuation, activation, self-regulation, final), reference is therefore made to the disclosure of operating modes/phases in international patent disclosure WO 2006/108931A1 and to FIGS. 4 to 8, in particular in order to understand how self-regulation of the valve assembly is obtained. Therefore international patent disclosure WO 2006/108931A1 is herewith incorporated by reference herein.

With the foregoing and other objects in view there is provided, in accordance with the invention, a self-regulated valve assembly. The valve assembly contains a valve body having a lower part with an input section for a connection to a tank intended to contain a fluid under pressure and, an upper part with an output for connection to a pipe system. A piston is movable in the valve body along a first axis between an open position enabling the fluid to communicate between the input section and the output, and a closed position cutting off the fluid communication. The piston has an upper end section and a lower sealing section. A spring type module is coupled to the piston and to the valve body and interacts dynamically with the piston at least after an actuation of the valve assembly and during an entire cycle of self-regulation of the valve assembly, imposing a positioning of the piston between the open position and the closed position, allowing fluid communication between the input section and the output under a controlled output pressure. The spring type module is positioned beneath the lower sealing section of the piston.

In accordance with an added feature of the invention, the spring type module can be inserted into the tank. More specifically, the spring type module is positioned in the lower part of the valve body, the lower part of the valve body itself being at least partially able to be inserted into the connection to the tank.

In accordance with another feature of the invention, the piston includes, beneath the lower sealing section, an additional cylindrical part which can be inserted into the tank and is movable in the lower part of the valve assembly.

In accordance with an additional feature of the invention, there is further provided a threaded axis coupled to the piston, a nut type movable element, and a movable retaining element. The spring type module has two ends held respectively between an edge of the lower part of the valve body and the movable retaining element. A position of the spring type module with respect to the edge is variable by translation along the first axis, namely by the nut type movable element which can be positioned on the threaded axis coupled to the piston. The nut type movable element may be an adjusting nut, one edge of the adjusting nut forms the edge of the lower part of the valve body.

In accordance with a further feature of the invention, the valve body has, in the upper part, an upper static pressure chamber and beneath the upper static pressure chamber an auxiliary piston. The auxiliary piston has a lower curved surface to guarantee reduced surface contact with an upper edge of the upper end section of the piston.

In accordance with another added feature of the invention, the valve body has a lower static pressure chamber beneath a lower edge of the sealing section of the piston. The lower static pressure chamber being, through activation of the valve assembly, balanced in pressure with the upper static pressure chamber having a minimal volume.

In accordance with a further additional feature of the invention, the piston has at most two circular guide generatrices against the valve body.

In accordance with another further feature of the invention, the piston has a middle section disposed between the end section and the sealing section and is positioned in an intermediate dynamic pressure chamber of the valve body, a volume of the middle section is greater than volumes of the upper and lower static pressure chambers. In particular, the volume of the middle section is greater than the volumes of the upper and lower static pressure chambers by a ratio of at least 3:1.

In accordance with yet another feature of the invention, the valve body has first and second channels, the intermediate dynamic pressure chamber is coupled to the tank connection by the first channels and the upper and lower static pressure chambers are coupled to the tank connection by the second channels. The first channels have a greater diameter than the second channels. In particular, the first channels have a greater diameter than the second channels in a ratio of at least 5:1.

In accordance with another feature of the invention, the valve body outside the tank exhibits, along the first axis, a height of less than 125 mm and, transversally to the first axis, a diameter of less than 83 mm.

In accordance with a concomitant feature of the invention, the movable retaining element is an adjusting nut. The spring type module has two ends held respectively between an edge of the lower part of the valve body and the movable retaining element. A position of the spring type module with respect to the edge is variable by translation along the first axis, namely by the adjusting nut.

Other features which are considered as characteristic for the invention are set forth in the appended claims.

Although the invention is illustrated and described herein as embodied in a self-regulated compact-geometry valve assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
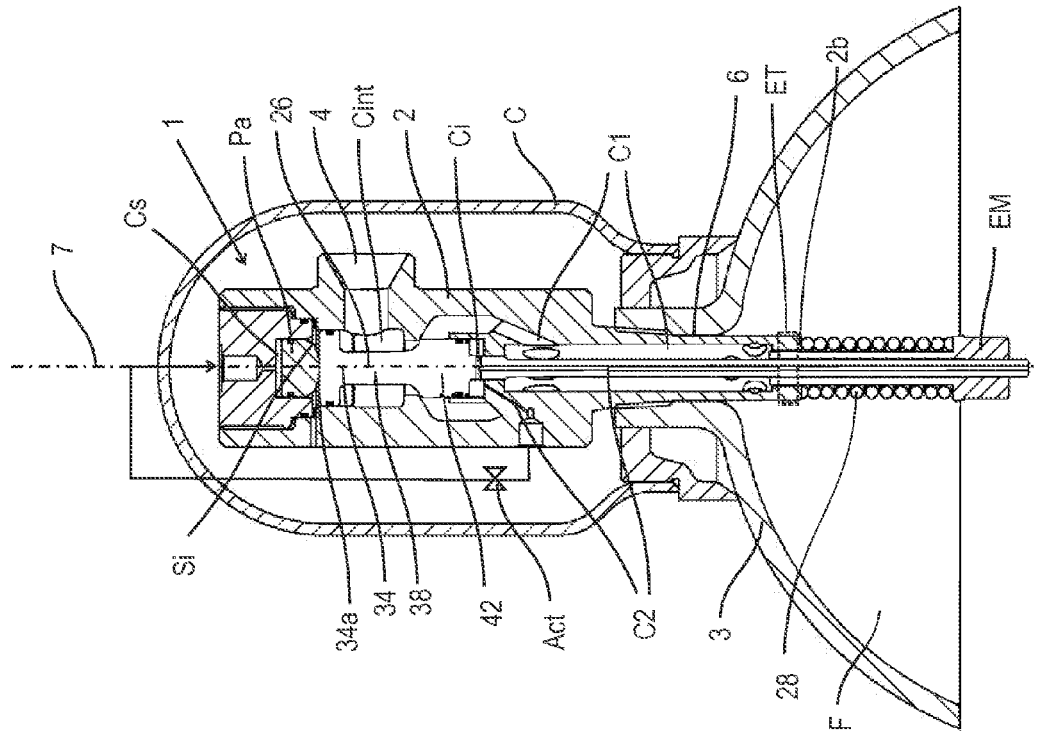
FIG. 2 is a diagrammatic, cross-sectional view of a second embodiment of the valve assembly according to the invention
Figure 1:
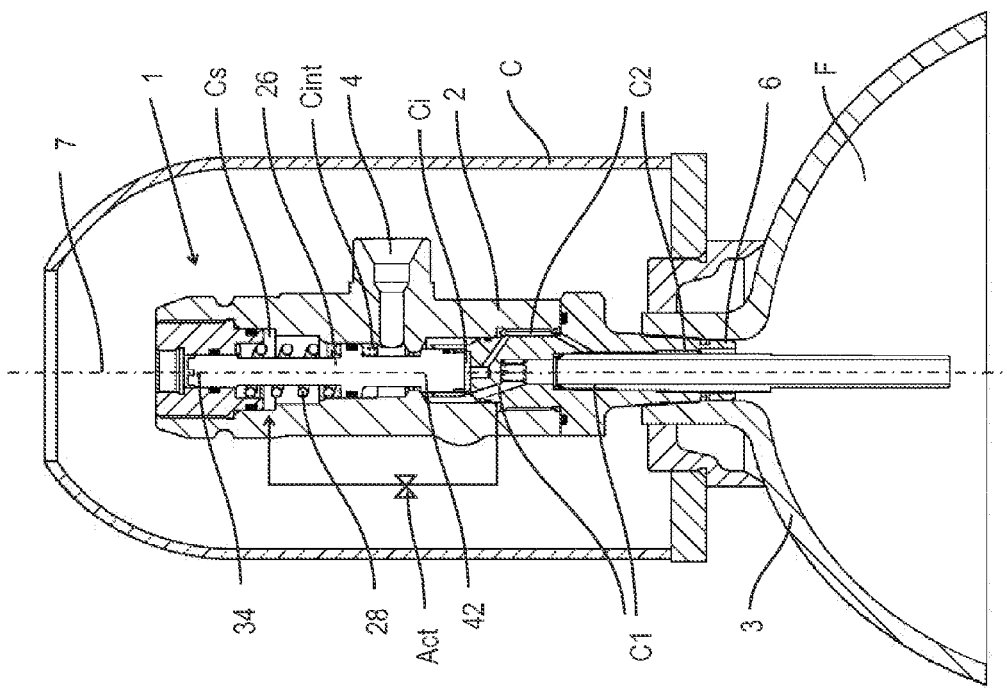
FIG. 1 is a diagrammatic, cross-sectional view of a first embodiment of a valve assembly according to the prior art.

Referring now to the figures of the drawing in detail and first, particularly, to FIGS. 1 and 2 thereof, there are shown different embodiments of a valve assembly 1 for an example of usage in connection with a fire safety system. In these embodiments of the fire safety system, the valve assembly 1 is connected (input section 6) to a tank 3 of fluid and to a pipe system (coupled to the output 4, but not represented in the present figures) configured to distribute fluid F to one or more sites, for example rooms inside a building. The tank 3 may be a cylindrical metal bottle with strong walls containing fluid at a pressure between about 200 bars and 500 bars, for example 300 bars. The fluid F may be an agent which suppresses and/or extinguishes fire. For example, the fluid may include an inert gas (such as nitrogen, argon) or a mixture of two or more inert gases, or any other fluid with fire extinction or suppression properties.

In service, for example in the detection of excessive heat, smoke or fire, the valve assembly 1 is activated to emit the fluid F in a predetermined time, at a perceptibly constant pressure below the pressure of the fluid in the bottle 3. The valve assembly 1 can deliver the fluid F at a perceptibly constant pressure between about 10 and 100 bars in about one or more minutes. In a version according to the invention and disclosed below in more detail, the valve assembly 1 advantageously delivers the fluid at a perceptibly constant pressure of about 40 bars in 40-50 seconds. Specialists in this field will appreciate the fact that the valve assembly 1 can be used not only in connection with a fire safety system, but also in any other system where a fluid at high pressure has to be delivered at a pressure lower than that of the tank 3 and perceptibly constant in a predetermined time.

For the purpose of illustration of the parts common to FIGS. 1 and 2 and in the passages which follow, the valve assembly 1, connected to the bottle 3, is represented in section vertically along one of its diameters and its axis of revolution 7 and contains a valve body 2. The cross-sectional representations in FIGS. 1 and 2 do not include hatching so as not to overburden the representations. FIGS. 1 and 2 are perceptibly in the same scale, so as to show that the valve assembly in FIG. 2 can be covered with a cap C of greatly reduced size with respect to a cap C which covers the valve assembly in FIG. 1. Only the closed position of the assembly is represented in both FIGS. 1 and 2 but, as mentioned above, the operating phases of actuation and then opening are similar to those in international patent publication WO2006/108931A1. The valve body 2 is generally oblong in shape, with opposed lower section and upper section. In any disclosure in the present document, relational terms such as "lower", "upper", "beneath", "bottom" or similar are used without limitation to denote features of the valve assembly 1, the valve assembly 1 being seen upright or in a perceptibly vertical position. However, it is understood in specialist circles in this field that such terms also apply when the valve assembly 1 is placed in another orientation. The lower part of the valve body 2 contains external threading to allow the valve assembly 1 to be screwed onto the bottle 3 in service, the screwing being free from any release of pressure to the exterior of the bottle 3.

Still in common with FIGS. 1 and 2, a valve assembly actuating unit contains an actuation Act positioned on one side of the valve body 2 and can be actuated by a signal emanating from a central point or a fire detection system, which activates an actuation mechanism (e.g., pneumatic, electrical or mechanical) applying a force on the actuating unit and thus initiating the valve assembly activation phase.

During the activation phase, "static pressure" channels C2 establish a pressure balance between the tank 3, a lower chamber Ci of the valve body 2 and an upper chamber Cs of the valve body 2. The static pressure balance has the effect of releasing a piston 26 from its closed position in that a lower sealing section 42 perceptibly moves towards the lower part of the valve body in the lower chamber Ci. Also under this activation phase, the pressure at the output 4 from the valve body 2 should be established as quickly as possible up to the desired constant level (for example 40 bar) in order to release the fluid F out of the valve assembly. This pressure is established through dynamic pressure balancing between the tank 3 and the output 4 via "dynamic pressure" channels C1 and an intermediate chamber Cint of the valve body 2 abutting onto the output 4. The intermediate chamber Cint is positioned between the upper chamber Cs and the lower chamber Ci of the valve body. A cylindrical part of the piston body 26 crosses the intermediate chamber Cint and locally exhibits a section with minimal diameter which, during dynamic pressure establishment (also known as the self-regulation phase) is maintained at a required distance from an annular abutment section integrated into the valve body in order to allow the fluid F to pass under the self-regulation conditions imposed between the section with minimal diameter of the piston 26 and the annular abutment section of the valve body 2. During these activation and self-regulation phases, a spring type module 28 provides for mechanically elastic maintenance of the piston 26 in position in the valve body 2 complementarily to the static and dynamic pressure balancing. At least until this operating stage involving the above features, the valve assemblies according to FIGS. 1 and 2 can be described analogously.

FIG. 2 thus schematically presents a self-regulated valve assembly 1 according to the invention containing:
a) the valve body 2 which, in the lower part, has the input section 6 for a connection to the tank 3 intended to contain a fluid F under pressure and, in the upper part, the output 4 for connection to a pipe system,
b) the piston 26 movable in the valve body 2 along a first axis 7 between an open position, enabling the fluid to communicate between the input section 6 and the output 4, and a closed position, cutting off the fluid communication, the piston 26 having an upper end section 34, and a lower sealing section 42, and
c) a spring type module 28 coupled to the piston 26 and to the valve body 2 and interacting dynamically with the piston at least after an actuation (Act) of the valve and during the entire cycle of self-regulation of the valve, imposing a positioning of the piston between its open and closed position, allowing fluid communication between the input section 6 and the output 4 under a controlled output pressure.

All these features are also presented in FIG. 1 according to the prior art WO2006/108931A1. Unlike the prior art, the self-regulated valve assembly according to the invention provides that the spring type module 28 is positioned beneath the lower sealing section 42 of the piston.

Preferentially, the valve assembly according to the invention provides that the spring type module 28 can be inserted into the tank 3. In fact, the spring type module 28 is positioned in the lower part of the valve body 2 beneath the lower chamber Ci, the lower part of the valve body itself being at least partially able to be inserted into the connection to the tank 3 in order to plunge into the fluid F. In comparison with WO2006/108931A1 according to FIG. 1, the spring type module 28 according to FIG. 2 is thus no longer housed inside the upper chamber Cs of the valve body 2, while it was configured to exert a restoring force on the piston, so as to bring it back to the open position. Hence, the upper chamber Cs according to FIG. 2 no longer contains the spring type module and it can be considerably reduced in size with respect to that in FIG. 1. Consequently, the valve body 2 and thus the self-regulated valve assembly is also highly advantageously miniaturized so as to be able to be covered by a smaller cap C.

The valve assembly according to the invention also provides that the piston 26 includes, beneath its lower sealing section 42, a piston extension in the form of an additional cylindrical part which can be inserted into the tank 3 and is movable in the lower part of the valve. In this way, the module such as a cylindrical spring can be slipped onto this additional part positioned/able to be inserted in the tank 3 through the connection 6. With respect to FIG. 1, this has the advantage that the space reserved for positioning the spring in a chamber in the upper part of the piston or valve body can consequently be reduced, since this space is then, according to FIG. 2, transposed into the tank 3. Thus, the dimensions of the upper part of the valve body 2 and the associated upper pressure chamber Cs can also be reduced, which implies that the cap C can also be reduced in size.

In order that the spring type module 28 along the additional cylindrical part can still be inserted into the tank 3, the spring type module exhibits two ends held respectively between an edge 2b of the lower part of the valve body and a movable retaining element EM, the position of which with respect to the edge 2b is preferentially variable by translation along the first axis 7, in particular by a nut type movable element which can be positioned on a threaded axis coupled to the piston. This type of holding with variable spacing thus makes it possible flexibly to adjust the spring under the conditions required for the operating phases of the valve assembly. For this purpose, the nut may be either the retaining element EM or alternatively or complementarily an adjusting nut ET one edge of which forms the edge 2b of the lower part of the valve body. In the case of an adjusting nut ET forming the edge 2b which is thus movable, it may be envisaged to have an adjustment mechanism by screwing the nut by a meshing or thrust system internal to the valve body and thus the adjuster is positioned in the external part of the connection to the tank 3, so that the adjustment can be carried out by an operator when the pressure tank and the valve body are rigidly coupled. Pressure measuring devices such as manometers can be positioned outside the tank and the valve body, but are not represented in the figures for reasons of clarity.

Also, the valve assembly according to the invention in FIG. 2 provides that the valve body 2 exhibits, in the upper part, the upper static pressure chamber Cs, beneath which there is an auxiliary piston Pa, the auxiliary piston exhibiting a curved lower surface Si to guarantee reduced surface contact with an upper edge 34a of the upper end section 34 of the piston. The auxiliary piston Pa as it were replaces the upper part of the piston 28 in FIG. 1. In other words, the piston in FIG. 1 has now been split into two piston blocks sliding in the valve body 2. Hence, the main part of the piston 26 positioned beneath the auxiliary piston Pa only exhibits at most two circular guide generatrices against the valve body 2. In FIG. 1, the piston has three circular guide generatrices against the valve body 2. The technical advantage obtained is to reduce or suppress static redundancy of the piston movable in the valve body 2.

The valve assembly according to the invention in FIG. 2 also provides that the valve body 2 exhibits the lower static pressure chamber Ci beneath a lower edge of the sealing section 42 of the piston 26, the lower chamber being, through activation of the valve, balanced in pressure with the upper static pressure chamber Cs preferably having a minimal volume. Since the upper chamber is now of minimal volume, it is quicker and simpler to equalize its pressure with the lower chamber, which allows the duration of the activation phase of the valve assembly to be shortened. The desired self-regulation is thus achieved more quickly.

The valve assembly according to the invention exhibits a middle section 38 of the piston 26 positioned between the end section 34 and the sealing section 42 and positioned in an intermediate dynamic pressure chamber Cint of the valve body, the volume of which is greater than the volumes of the upper and lower static pressure chambers, in particular in a ratio of at least 3:1. This ratio between the volumes of the chambers is a sizing criterion of the valve body 2 to be taken into account when miniaturizing the body in order that the required conditions for the activation and self-regulation phases are optimally achieved under a controlled output duration and pressure. With such a criterion, it is possible to obtain at the output 4 a pressure range between 30 and 60 bar, ideally close to 40 bar, at a duration of 40 to 60 seconds at stabilized pressure.

With the same objective as before, the valve assembly according to the invention provides that the intermediate dynamic pressure chamber Cint is coupled to the connection of the tank 3 by first channels C1 and that the upper Cs and lower Ci static pressure chambers are coupled to the connection of the tank 3 by second channels C2, the first channels C1 exhibiting a greater diameter than the second channels C2, in particular in a ratio of at least 5:1. Here again, the sizing under a miniaturized form of valve body makes it possible to achieve optimum activation and self-regulation conditions according to the results given above.

Finally, the valve assembly according to the invention making it possible to produce a valve body outside the tank 3 exhibits, along the first axis 7, a height of less than 125 mm and, transversally to the axis, a diameter of less than 83 mm.

The invention claimed is:

1. A self-regulated valve assembly, comprising: a valve body having a lower part with an input section for a connection to a tank intended to contain a fluid under pressure and, an upper part with an output for connection to a pipe system; a piston movable in said valve body along a first axis between an open position enabling the fluid to communicate between said input section and said output, and a closed position cutting off the fluid communication, said piston having an upper end section and a lower sealing section; and a spring type module coupled to said piston and to said valve body and biasing said piston to an open position, said spring type module interacting dynamically with said piston at least after an actuation of the valve assembly and during an entire cycle of self-regulation of the valve assembly, imposing a positioning of said piston between the open position and the closed position, allowing fluid communication between said input section and said output under a controlled output pressure, said spring type module positioned between said lower sealing section of said piston and an interior of the tank.

2. The valve assembly according to claim 1, wherein said spring type module can be inserted into the tank.

3. The valve assembly according to claim 2, wherein said spring type module is positioned in said lower part of said valve body, said lower part of said valve body itself being at least partially able to be inserted into the connection to the tank.

4. The valve assembly according to claim 3, wherein said piston includes, beneath said lower sealing section, an additional cylindrical part which can be inserted into the tank and is movable in said lower part of the valve assembly.

5. The valve assembly according to claim 1, wherein said valve body has, in said upper part, an upper static pressure chamber and beneath said upper static pressure chamber an auxiliary piston, said auxiliary piston having a lower curved surface.

6. The valve assembly according to claim 5, wherein said piston has at most two circular guide lands against said valve body.

7. The valve assembly according to claim 1, wherein said valve body outside the tank exhibits, along the first axis, a height of less than 125 mm and, transversally to said first axis, a diameter of less than 83 mm.

8. A self-regulated valve assembly, comprising:
a valve body having a lower part with an input section for a connection to a tank intended to contain a fluid under pressure and, an upper part with an output for connection to a pipe system;
a piston movable in said valve body along a first axis between an open position enabling the fluid to communicate between said input section and said output, and a closed position cutting off the fluid communication, said piston having an upper end section and a lower sealing section;
a spring type module coupled to said piston and to said valve body and interacting dynamically with said piston at least after an actuation of the valve assembly and during an entire cycle of self-regulation of the valve assembly, imposing a positioning of said piston between the open position and the closed position, allowing fluid communication between said input section and said output under a controlled output pressure, said spring type module positioned beneath said lower sealing section of said piston and disposed in the tank;
a threaded axis coupled to said piston;
a nut type movable element; and
a movable retaining element, said spring type module has two ends held respectively between an edge of said lower part of said valve body and said movable retaining element, a position of said spring type module with respect to said edge is variable by translation along the first axis, namely by said nut type movable element which can be positioned on said threaded axis coupled to said piston.

9. A self-regulated valve assembly, comprising: a valve body having a lower part with an input section for a connection to a tank intended to contain a fluid under pressure and, an upper part with an output for connection to a pipe system, said valve body having, in said upper part, an upper static pressure chamber and beneath said upper static pressure chamber an auxiliary piston, said auxiliary piston having a lower curved surface, wherein said valve body having a lower static pressure chamber beneath a lower edge of said sealing section of said piston, said lower static pressure chamber being, through activation of the valve assembly, balanced in pressure with said upper static pressure chamber; a piston movable in said valve body along a first axis between an open position enabling the fluid to communicate between said input section and said output, and a closed position cutting off the fluid communication, said piston having an upper end section and a lower sealing section; and a spring type module coupled to said piston and to said valve body and interacting dynamically with said piston at least after an actuation of the valve assembly and during an entire cycle of self-regulation of the valve assembly, imposing a positioning of said piston between the open position and the closed position, allowing fluid communication between said input section and said output under a controlled output pressure, said spring type module positioned between said lower sealing section of said piston and an interior of the tank.

10. A self-regulated valve assembly, comprising: a valve body having a lower part with an input section for a connection to a tank intended to contain a fluid under pressure and, an upper part with an output for connection to a pipe system, said valve body having, in said upper part, an upper static pressure chamber and beneath said upper static pressure chamber an auxiliary piston, said auxiliary piston having a lower curved surface; a piston movable in said valve body along a first axis between an open position enabling the fluid to communicate between said input section and said output, and a closed position cutting off the fluid communication, said piston having an upper end section and a lower sealing section, said piston having an intermediate section disposed between said end section and said sealing section and is positioned in an intermediate dynamic pressure chamber of said valve body, a volume of said intermediate section is greater than volumes of said upper and lower static pressure chambers; and a spring type module coupled to said piston and to said valve body and interacting dynamically with said piston at least after an actuation of the valve assembly and during an entire cycle of self-regulation of the valve assembly, imposing a positioning of said piston between the open position and the closed position, allowing fluid communication between said input section and said output under a controlled output pressure, said spring type module positioned between said lower sealing section of said piston and an interior of the tank.

11. The valve assembly according to claim 10, wherein:
said valve body having first and second channels;
said intermediate dynamic pressure chamber is coupled to the tank connection by said first channels;
said upper and lower static pressure chambers are coupled to the tank connection by said second channels; and
said first channels having a greater diameter than said second channels.

12. The valve assembly according to claim 11, wherein said first channels have a greater diameter than said second channels in a ratio of at least 5:1.

13. The valve assembly according to claim 10, wherein said volume of said intermediate section is greater than said volumes of said upper and lower static pressure chambers by a ratio of at least 3:1.

14. A self-regulated valve assembly, comprising:
a valve body having a lower part with an input section for a connection to a tank intended to contain a fluid under pressure and, an upper part with an output for connection to a pipe system;
a piston movable in said valve body along a first axis between an open position enabling the fluid to communicate between said input section and said output, and a closed position cutting off the fluid communication, said piston having an upper end section and a lower sealing section;
a spring type module coupled to said piston and to said valve body and interacting dynamically with said piston at least after an actuation of the valve assembly and during an entire cycle of self-regulation of the valve assembly, imposing a positioning of said piston between the open position and the closed position, allowing fluid communication between said input section and said output under a controlled output pressure, said spring type module positioned beneath said lower sealing section of said piston and disposed in the tank; and
a movable retaining element being an adjusting nut, said spring type module having two ends held respectively between an edge of said lower part of said valve body and said movable retaining element, a position of said spring type module with respect to said edge is variable by translation along the first axis, namely by said adjusting nut.

* * * * *